United States Patent [19]

Uemura

[11] 3,807,741

[45] Apr. 30, 1974

[54] AUTOMATIC CASSETTE CHANGER

[75] Inventor: Yasuhiro Uemura, Tokyo, Japan

[73] Assignee: Teac Corporation, Tokyo, Japan

[22] Filed: Jan. 14, 1972

[21] Appl. No.: 217,910

[30] Foreign Application Priority Data

| | | |
|---|---|---|
| Jan. 16, 1971 | Japan | 46-856 |
| July 21, 1971 | Japan | 46-64526[U] |
| July 21, 1971 | Japan | 46-64527[U] |

[52] U.S. Cl. .... 360/92
[51] Int. Cl. .... G11b 15/12, G11b 31/00
[58] Field of Search .... 274/4 F

[56] References Cited

UNITED STATES PATENTS

| | | | |
|---|---|---|---|
| 3,589,733 | 6/1971 | Piotrowski | 274/4 F |
| 3,617,066 | 11/1971 | Foelkel | 274/4 F |
| 3,494,622 | 2/1970 | Zeigler | 274/4 F |

*Primary Examiner*—Harry N. Haroian
*Attorney, Agent, or Firm*—Marshall & Yeasting

[57] ABSTRACT

An automatic cassette changer employing a plurality of Phillips type cassettes, in which the cassettes are held by cassette holders disposed on a cassette support at predetermined intervals and brought to a predetermined play position one after another with their casing being held in a vertical direction, a magnetic tape contained in each cassette brought to the play position is driven by a capstan and reel drive shafts to cooperate with a magnetic head mounted on an actuating mechanism together with the capstan and the reel drive shafts, and the actuating mechanism is movable only in a straight line relative to the cassette support.

7 Claims, 13 Drawing Figures

AUTOMATIC CASSETTE CHANGER

BACKGROUND OF THE INVENTION

1. Field of the Invention

This invention relates to an automatic cassette changer which employs a plurality of cassettes, each of which is of the type that a magnetic tape wound on reels having central apertures is contained in a casing having a first major surface formed with at least reel drive shaft apertures and a capstan aperture and a second major surface formed with a magnetic head opening and substantially perpendicular to the first major surface, and in which the cassettes are selected one after another to automatically reproduce signals from the magnetic tapes continuously for many hours.

2. Description of the Prior Art

There have heretofore been proposed some automatic cassette changers of this kind but they are not satisfactory because of bulkiness and complexity in mechanism.

SUMMARY OF THE INVENTION

One object of this invention is to provide an automatic cassette changer which is compact in its entirety but capable of loading of many cassettes on a cassette support to enable long-time, continuous playback of tapes contained in the cassettes.

Another object of this invention is to provide an automatic cassette changer which is so simplified in construction as to require only a straight-line movement of a cassette support and an actuating mechanism relative to each other for playback of a tape contained in each of cassettes loaded on the cassette support by a magnetic head mounted on the actuating mechanism together with tape driving means.

Other objects, features and advantages of this invention will become apparent from the following description taken in conjunction with the accompanying drawings.

DESCRIPTION OF THE PREFERRED EMBODIMENTS

Figure 1:
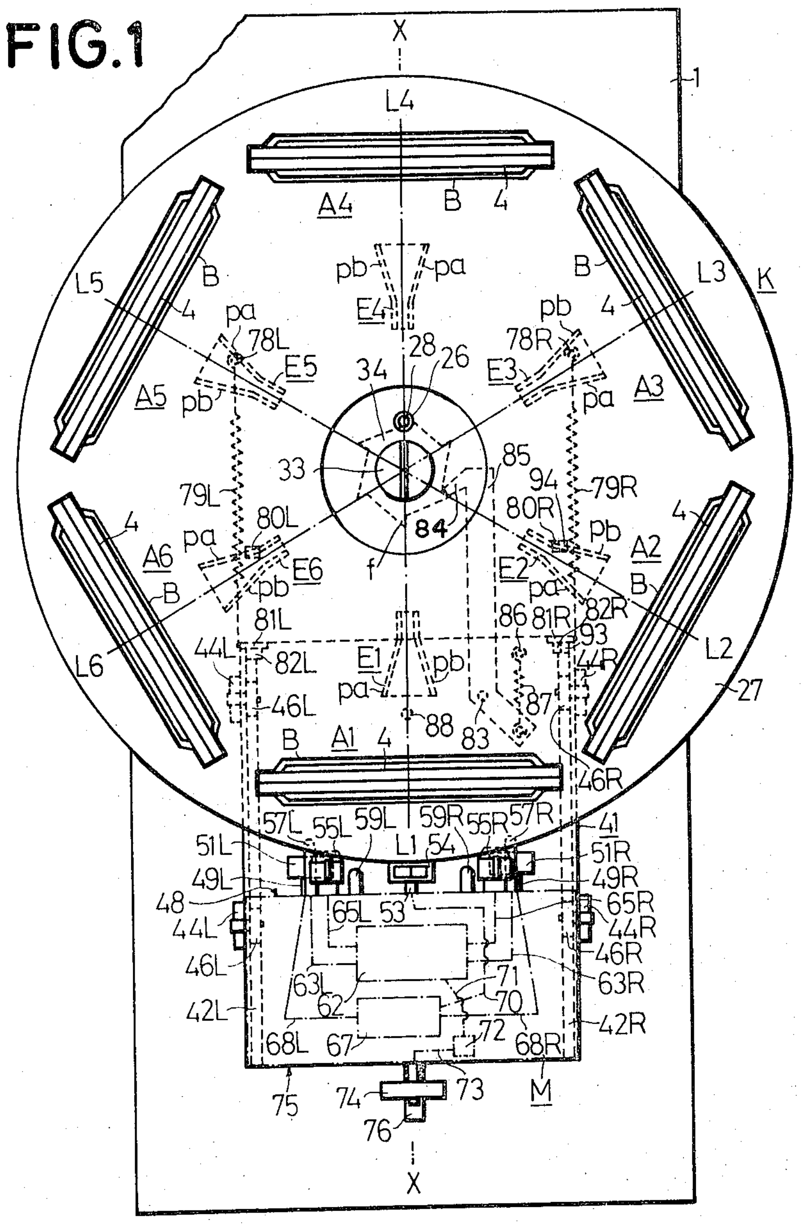
FIG. 1 is a plan view illustrating one example of an automatic cassette changer of this invention.

In the drawings reference numeral 1 indicates a horizontal chassis, on which a shaft 2 is fixedly planted, the shaft 2 having mounted thereon a cassette support K detachably and rotatably. The cassette support K comprises a disc 27 having a centrally disposed aperture 25 and an aperture 26 a little spaced therefrom. The shaft 2 rotatably journals into a sleeve 32 which has a flange 29 with a pin 28 planted thereon at the upper end thereof and threads 31 formed on the inner wall of its bore 30 at the upper end portion thereof. With the central aperture 25 being aligned with the central bore 30 of the sleeve 32 and the pin 28 being inserted into the aperture 26, the underside of the central portion of the disc 27 rests on the upper surface on the flange 29 and then a bolt 33 is inserted through the central aperture 25 from above into the bore 30 of the sleeve 32 to be threadably engaged therewith, thus rotatably mounting the disc 27 on the shaft 2.

The disc 27 of the cassette support K has disposed thereon six cassette holders A1 to A6 for holding the cassettes 4 respectively, which cassette holders A1 to A6 are arranged on the disc 27 to extend in directions perpendicular to six radial lines L1 to L6 passing through the shaft 2 and extending radially of the disc 27 at equiangular intervals.

Figure 3A:
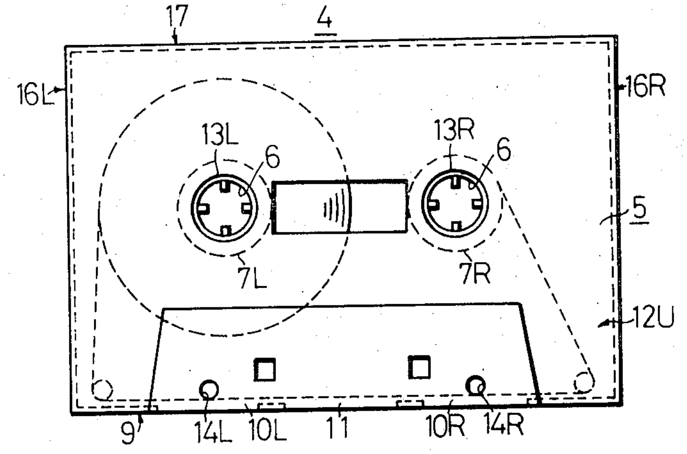
FIGS. 3A and 3B are plan and front views of a cassette usable in this invention.
Figure 3B:
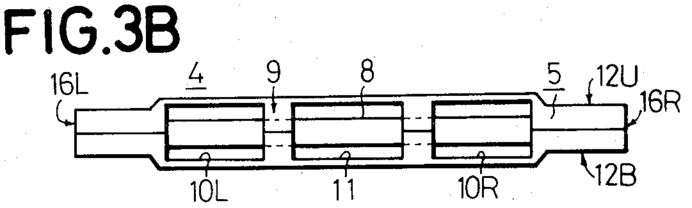

The cassette 4 to be held by each of the cassette holders A1 to A6 is of the construction of the so-called Phillips type cassette such as shown in FIG. 3. Namely, a pair of rotatable tape reels 7L and 7R each having an aperture 6 disposed centrally thereof are disposed in a casing 5 and a magnetic tape 8 is wound on the tape reels 7L and 7R and extends therebetween across a left pinch roller opening 10L, a magnetic head opening 11 and a right pinch roller opening 10R which are formed in the front wall 9 of the casing 5. In the top 12U and bottom 12B of the casing 5 there are formed reel shaft apertures 13L and 13R through which reel shafts are inserted into the central apertures 6 of the tape reels 7L and 7R respectively. Further, the top 12U and bottom 12B of the casing 5 have formed therein at the front marginal portions thereof a pair of left and right capstan apertures 14L and 14R corresponding to the left and right pinch roller openings 10L and 10R and a pair of left and right apertures 15L and 15R symmetrically between the pinch roller opening 14L and the magnetic head opening 11 and between the latter and the pinch opening 10R respectively. Reference numerals 16L and 16R indicate left and right sides of the casing 5 respectively and 17 its back.

Each of the cassette holders A1 to A6 comprises a cassette receiving opening B, a pair of cassette guide frames CL and CR which are attached to the underside of the disc 27 to guide right and left sides 16L and 16R of the cassette 4 with the top 12U and bottom 12B of the casing 5 being held substantially perpendicular to the chassis 1 when the cassette 4 is inserted into the opening B from above and cassette receiving frames DL and DR which extend inwardly from the lower ends of the cassette guide frames CL and CR to receive right and left corners of the front wall 9 of the cassette 4 when the cassette is guided down to its lowered position by means of the guide frames CL and CR.

Figure 4:
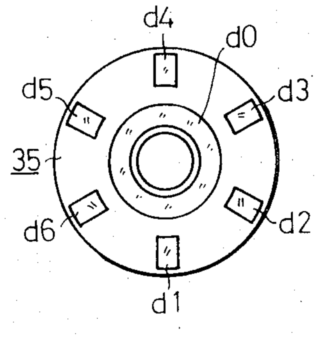
FIG. 4 is a plan view showing one example of a contact plate usable in this invention.

On the radial lines L1 to L6 on the underside of the disc 27 of the cassette support K there are provided guide members E1 to E6, each consisting of a pair of plate-like members *pa* and *pb* which are disposed in the radial direction of the disc 27 with the distance therebetween gradually increasing as the edge of the disc 27 is approached. The lower end of the sleeve 32 has attached thereto a ratchet wheel 34 having six clicks. On the chassis 1 there is fixedly mounted about the shaft 2 a contact plate 35 such as shown in FIG. 4 which has an annular electrode d0 and six electrodes *d*1 to *d*6 disposed about the electrode d0 at equiangular intervals.

An actuating mechanism M is mounted on the chassis 1 in a manner to be movable with respect to the cassette support K above mentioned. The mechanism M is constructed on a sub-chassis 41. Guide grooves 42L and 42R are formed in the sub-chassis 41 at left and right side marginal edges thereof and a plurality of support pieces 44L and 44R are mounted on the chassis 1 at positions corresponding to the grooves 42L and 42R of the sub-chassis 41. The support pieces 44L and 44R carry rollers 46L and 46R respectively which make rotary contact with the upper surface of the chassis 1 and engage the guide grooves 42L and 42R of the sub-chassis 41. Namely, the sub-chassis 41 is mounted on the chassis 1 through the rollers 46L and 46R, and hence adapted to be movable relative to the cassette support K along an imaginary line X—X passing through the shaft 2 on which the support K is mounted.

The actuating mechanism M mounted and constructed on the sub-chassis 41 is provided with left and right tape reel drive shafts 55L and 55R and left and right capstans 57L and 57R which are perpendicular to an imaginary vertical plane 48 on the side of the support K crossing the plane of the sub-chassis 41 and project toward the support K, left and right pinch rollers 51L and 51R mounted on the shafts 49L and 49R crossing the plane 48 at right angles thereto and extending toward the support K, the magnetic head 54 carried by a support 53 projecting from the plane 48 toward the support K with its tape contact surface being held upward and left and right locating pins 59L and 59R projecting from the plane 48 toward the support K. Although not described in detail, the capstans 57L and 57R are adapted to be driven through transmission mechanisms, generally indicated by chain lines 63L and 63R, by a drive mechanism 62 including a motor fixedly mounted on the sub-chassis 41. The reel drive shafts 55L and 55R are also driven by the drive mechanism 62 through transmission mechanisms generally shown by chain lines 65L and 65R. The shafts 49L and 49R of the pinch rollers 51L and 51R are designed such that the pinch rollers 51L and 51R may be mechanically moved into rotary contact with the capstans 57L and 57R through transmission mechanisms, indicated by chain lines 68L and 68R, by means of actuating mechanism 67 including a plunger. The support 53 of the magnetic head 54 is also mechanically moved by the actuating mechanism 67 through a transmission mechanism indicated by a chain line 70. In this case, the capstans 57L and 57R are located at positions corresponding to the capstan apertures 14L and 14R of the cassette 4 which is held by the holder, for example, A1 after being inserted into opening B and guided by the guide frames CL and CR down to the receiving frames DL and DR and which is brought to such a rotational position of the cassette support K, as is illustrated in FIG. 1, where the wall 12U and/or 12B, i.e., the first major surface of the cassette 4 lies perpendicular to the imaginary line X—X. The red drive shafts 55L and 55R are also disposed corresponding to the reel shaft apertures 13L and 13R of the cassette 4 at such a position as above described. The pins 59L and 59R are also located corresponding to the apertures 151 and 15R of the cassette 4 at the above position. The pinch rollers 51L and 51R are disposed below the front wall 9, i.e., the second major surface of the cassette 4 at the above position and corresponding to the openings 10L and 10R when the actuating mechanism 67 is in its non-energized condition. The head 54 is also positioned below the front wall 9 of the cassette 4 at the above position and corresponding to the opening 11 when the actuating mechanism 67 is in its non-energized condition.

On the sub-chassis 41 there is provided a worm gear 74 which projects toward the plane 75 on the opposite side from the vertical plane 48 and which is driven by the drive mechanism 62 through a transmission mechanism 71, a clutch mechanism 72 and a transmission mechanism 73. A gear 76 meshing with the worm gear 74 is disposed on the chassis 1 so that the sub-chassis 41 may be moved by the rotation of the worm gear 74 relative to the chassis 1 along the line X—X. Further, pins 78L and 78R are planted on the backward portion of the chassis 1 at the right- and left-hand positions thereof and springs 79L and 79R are stretched between the pins 78L and 78R and right- and left-hand rear edges of the sub-chassis 41 respectively, so that the sub-chassis 41 is pulled by the springs 79L and 79R toward the cassette support K. Accordingly, the sub-chassis 41 is normally biased by the springs 79L and 79R on the side of the cassette support K and is retained in its biased condition by the engagement of a stopper piece 80L and 80R mounted on the chassis 1 with an engaging pieces 81L and 81R similarly mounted on the sub-chassis 41. When the worm gear 74 is coupled by the clutch mechanism 72 with the actuating mechanism 67 and is thereby driven under such conditions, the sub-chassis 41 is moved away from the cassette support K. When the sub-chassis 41 has moved a predetermined distance in a direction away from the cassette support K to bring the aforementioned engaging pieces 81L and 81R into engagement with another stopper pieces 82L and 82R mounted on the chassis 1, the gear 74 is disconnected by the clutch mechanism 72 from the actuating mechanism 67 as will hereinafter be described, thereby to automatically return the sub-chassis 41 to the aforementioned biased position. In this case, when the sub-chassis 41 lies in its biased position on the side of the cassette support K, the capstans 57L and 57R are inserted into the capstan apertures 14L and 14R respectively, the reel shafts 55L and 55R are inserted into the apertures 6 of the reels 7L and 7R through the reel shaft apertures 13L and 13R respectively, the pinch rollers 51L and 51R face the openings 10L and 10R from beneath respectively and the magnetic head 54 similarly faces the opening 11 from beneath. Under such conditions, when the capstan 57L (or 57R) and the shaft 55L (or 55R) are driven and the actuating mechanism 67 for the pinch roller 51L (or 51R) and the magnetic head 54 is energized, the pinch roller 51L (or 51R) is brought through the opening 10L (or 10R) into rotary contact with the capstan 57L (or 57R) with the magnetic tape 8 being gripped therebetween and the magnetic head 54 is also moved into contact with the magnetic tape 8 through the opening 11 to reproduce signals recorded on the magnetic tape 8 which is transferred from the reel 7R (or 7L) to the reel 7L (or 7R).

Further, a rotary arm 85 having a click 84 at one free end is journalled by a pin 83 on the sub-chassis 41 and a spring 87 is stretched between the other free end of the arm 85 and a pin 86 planted on the sub-chassis 41 to bias the rotary arm 85 in a direction to engage its click 84 with the aforementioned ratchet wheel 34. Namely, the rotary arm 85 is adapted such that every time the subchassis 41 is moved away from its biased position on the side of the cassette support K and then back to the biased position as above described, the click 84 of the rotary arm 85 engages each of the clicks *f* of the ratchet wheel 34 to turn the sleeve and consequently the cassette support K about the shaft 2 through about 360°/6. The shapes of the rotary arm 85 and the clicks *f* of the ratchet wheel 34 and their relative arrangements are selected so that each of the aforementioned lines L1 to L6 may become substantially aligned with the imaginary line X—X at every rotational movement of the cassette support K through approximately 360°/6. Further, a pin 88, which cooperates with each of the aforementioned guide members E1 to E6 mounted on the cassette support K, is planted on the sub-chassis 41 in alignment with the line X—X. When the sub-chassis 41 is brought back to its biased position on the side of the cassette support K, the pin 88 enters one of the guide members E1 to E6 so that when the cassette support K has turned through about 360°/6 one of the lines L1 to L6 is brought into exact alignment with the line X—X.

To the lower end face of the aforementioned sleeve 32 is attached a movable contact 89 which bridges the annular electrode *d*0 and any one of the electrodes *d*1 to *d*6 on the contact plate 35 and by which the electrodes *d*1 and *d*6 are sequentially selected at every rotation of the cassette support K through 360°/6.

Figure 2:
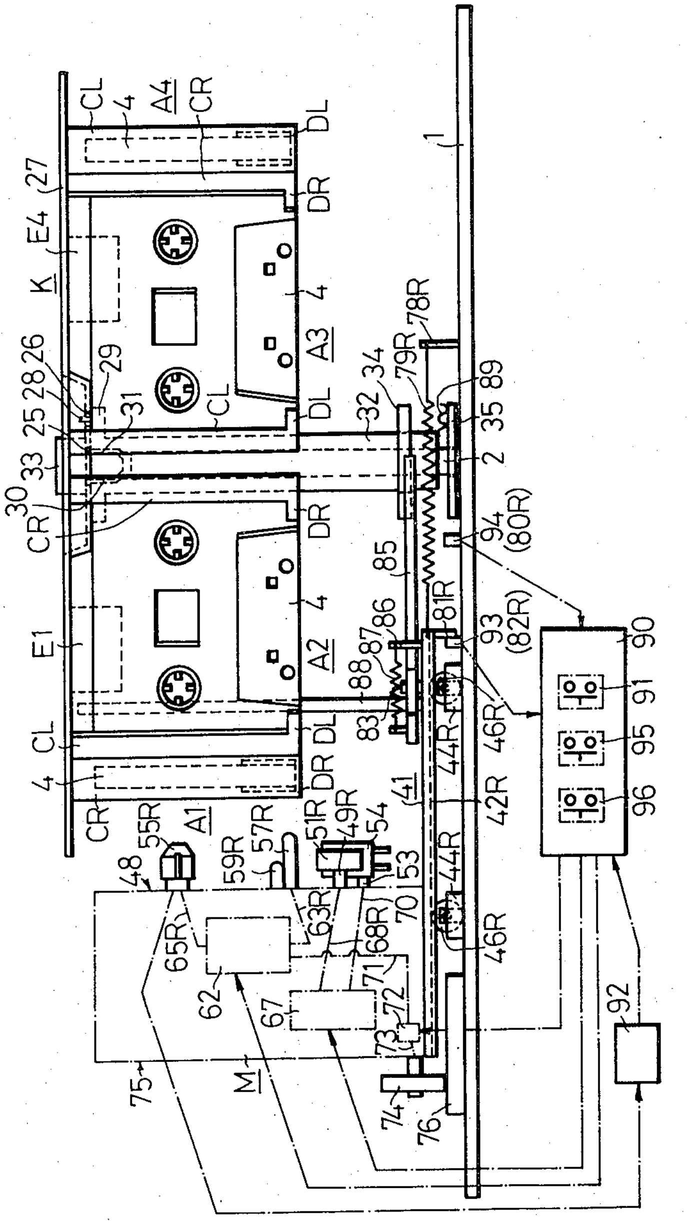
FIG. 2 is a side view of the automatic cassette changer of FIG. 1.

The foregoing has outlined one example of the mechanical construction of the automatic cassette changing apparatus of the present invention. The respective parts of the apparatus are operated under the control of an electrical control circuit generally indicated by 90 in FIG. 2, as will hereinbelow be described.

Assume that the sub-chassis 41 and consequently the actuating mechanism M is retained in its biased position on the side of the cassette support K and that the capstans 57L and 57R and the shafts 55L and 55R are in engagement with the cassette 4 held by the holder A1 on the cassette support K. Depressing a play push button 91 included in the electrical control circuit 90, the drive mechanism 62 is energized to drive the capstan 57R and the shaft 55R and the actuating mechanism 67 is also energized to bring the one pinch roller 51R into rotary contact with the capstan 57R with the magnetic tape 8 gripped therebetween and the magnetic head 54 into contact with the magnetic tape 8 and the tape 8 is transferred from the reel 7L to the reel 7R. Assuming that the magnetic tape 8 has, for example, first and second tracks, signals recorded, for example, on the first track of the magnetic tape 8 are reproduced by the magnetic head 54 and supplied to a speaker (not shown) through an amplifier (not shown). Thus, the magnetic tape 8 is transferred from the reel 7L to the reel 7R and when the tape 8 is stopped (assuming that the tape is retained at both ends of the reels 7L and 7R), it is detected by a known means, for example, a tape stop detecting means 92 constructed in association with the shaft 55L or 55R and the detected signal is supplied to the control circuit 90 to control the drive mechanism 62, stopping the rotation of the capstan 57R and the shaft 55R. Conversely, however, the capstan 57L and the shaft 55L are driven and the actuating mechanism 67 is controlled to disengage the pinch roller 51R from the capstan 57R but bring the pinch roller 51L into rotary contact with the capstan 57L with the magnetic tape 8 gripped therebetween and the magnetic tape 8 is transferred from the reel 7R to the reel 7L and signals recorded on the second track of the tape 8 are similarly reproduced by the magnetic head 54 and supplied to the speaker. Then, when the tape 8 is stopped after being transferred to the reel 7L, the stoppage of the tape is similarly detected by the aforementioned detecting means 92. Based upon the detected signal, the drive mechanism 62 is controlled to stop the rotation of the capstan 57L and the shaft 55L, so that the capstans 57L and 57R and the shafts 55L and 55R are in a standstill. Further, the actuating mechanism 67 is also controlled to disengage the pinch roller 51L from the capstan 57L, so that the both pinch rollers 51L and 51R are off the capstans 57L and 57R respectively and the magnetic head 54 is also disengaged from the magnetic tape 8. The clutch mechanism 72 is then energized to drive the worm gear 74, by which the sub-chassis 41 is slid along the line X—X in a direction opposite from the cassette support K against the springs 79L and 79R to disengage the capstans 57L and 57R and the shafts 55L and 55R from the cassette 4 held by the holder A1 on the cassette support K. Thus, when the sub-chassis 41 has slid a predetermined distance in the opposite direction from the cassette support K, it is detected, for example, by a microswitch 93 disposed at the position of the stopper piece 82R and the detected signal is fed to the control circuit 90. Based upon the detected signal, the clutch mechanism 72 is controlled to disconnect the drive mechanism 62 and the gear 74 from each other, permitting the sub-chassis 41 to return to the original position owing to the biasing force of the springs 79L and 79R. While the sub-chassis 41 moves from the initial position, the cassette support K is turned through about 360°/6 by the cooperation of the rotary arm 85 and the ratchet wheel 34 to bring the next cassette 4 held by the holder A2 to the position on the line X—X. When the sub-chassis 41 has been brought back to the original position, it is detected, for example, by a microswitch 94 disposed at the position of the stopper piece 80R and the detected signal is supplied to the control circuit 90. Based upon the detected signal, the same operations as those resulting from the depression of the "play" button are achieved and the aformentioned operations are repeated again. Thus, signals recorded on the magnetic tapes contained in the cassettes 4 held by the holders A1 to A6 on the cassette support K are successively reproduced and such reproduction is continued unless a "stop" button is depressed.

Depressing a "cassette change" push button included in the electrical control circuit 90, even if the magnetic tape of any one of the cassette is being played back, an operation similar to that for obtaining the detected signal after reproducing the second track of the tape 8 is obtained with the aforementioned detecting means 92 and thereafter the same operations as those previously described are carried out.

With such sequential rotation of the cassette support K, the contact 89 sequentially selects the electrodes *d*1 to *d*6 on the contact plate 35, so that, for example, if pilot lamps (not shown) are connected to a power source through the electrodes *d*1 to *d*6 respectively, it is possible to light the pilot lamp corresponding to the selected electrode based on a signal derived therefrom and hence indicate the playback of the tape contained in the cassette corresponding to the electrode being selected by the contact 39.

The following will describe some advantages resulting from the construction of the present invention described in the foregoing.

With the above arrangement, a plurality of cassettes are sequentially selected and signals recorded on the tapes contained therein are automatically reproduced continuously for many hours, so that this invention is of particular utility when employed for enjoying background music or when mounted in automobiles or the like.

Since the plurality of cassettes are loaded on the cassette support K with the surfaces 12U and 12B of the cassettes perpendicular to the plane of the horizontal chassis, the overall size of the apparatus in which the cassette support K is rotatably mounted on the shaft 2 as above described is smaller than that of an apparatus in which a plurality of cassettes are loaded on the chassis 1 with their surfaces lying in parallel to the chassis. Accordingly, the overall size of the apparatus can be reduced and the mechanism for moving the actuating mechanism M relative to the cassette support K is also simplified such that they are moved on a straight line relative to each other.

Further, the power for moving the actuating mechanism M relative to the cassette support K is derived from the actuating mechanism M which naturally requires a power source, so that no special power source therefor is required and the apparatus can be produced at lower cost.

Use is made of the cooperation of the guide members E1 to E6 mounted on the cassette support K with the pin 88 mounted on the actuating mechanism M in sequentially bringing the plurality of cassettes loaded on the support K to the predetermined position, so that each cassette can be brought accurately in the playing position.

Since the cassette support K is detachably mounted on the shaft 2, the support K can be readily replaced with another one with other cassettes loaded thereon.

Further, the contact mechanism made up of the contact plate 35 and the contact 89 derives therefrom signals capable of indicating the cassettes which are sequentially brought to the predetermined position. Accordingly, it is possible to indicate which cassette is in the played back condition by utilizing the signal drived from the contact mechanism.

In addition to the above advantages, since the sequential rotation of the cassette support K is achieved in synchronism with the movement of the actuating mechanism M relative to the cassette support K based upon the latter, there is no possibility that the actuating mechanism M strikes against the cassette support K while the latter is being rotated.

Figure 5:
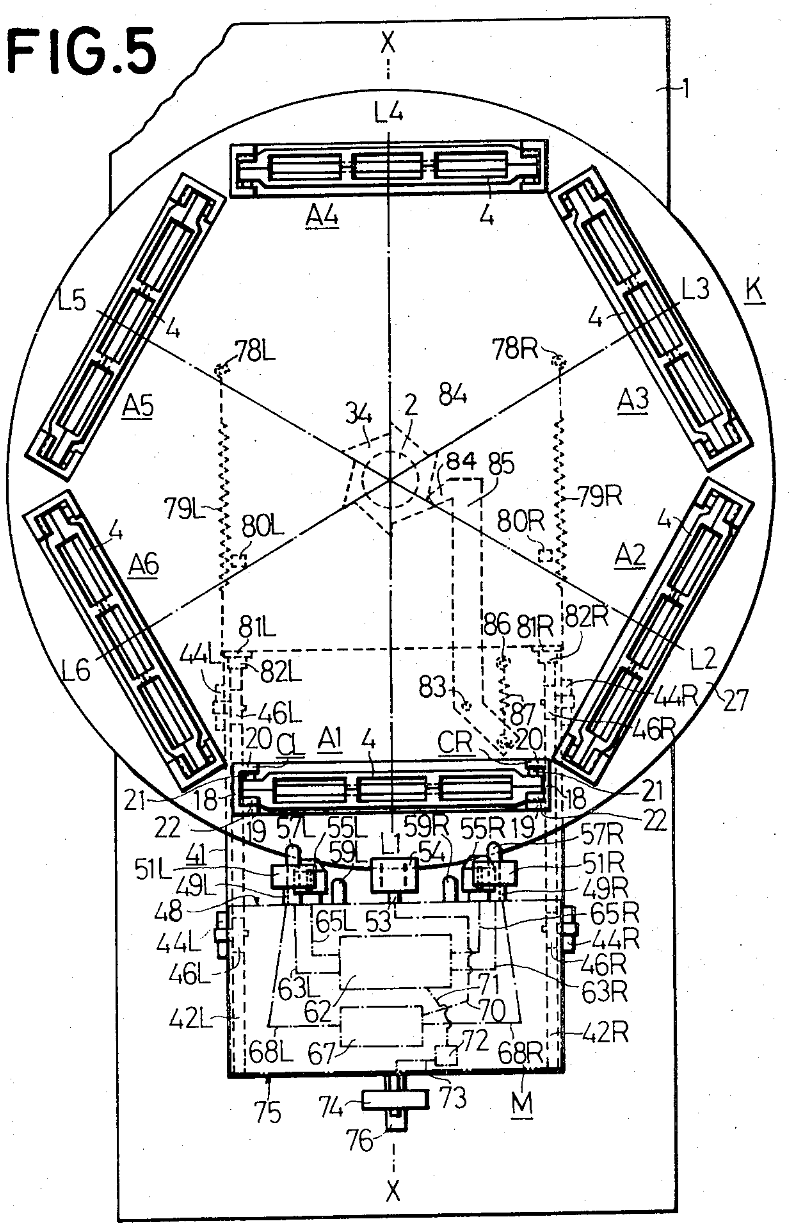
FIGS. 5 and 6 are plan and side views, similar to FIGS. 1 and 2, illustrating another example of this invention.
Figure 6:
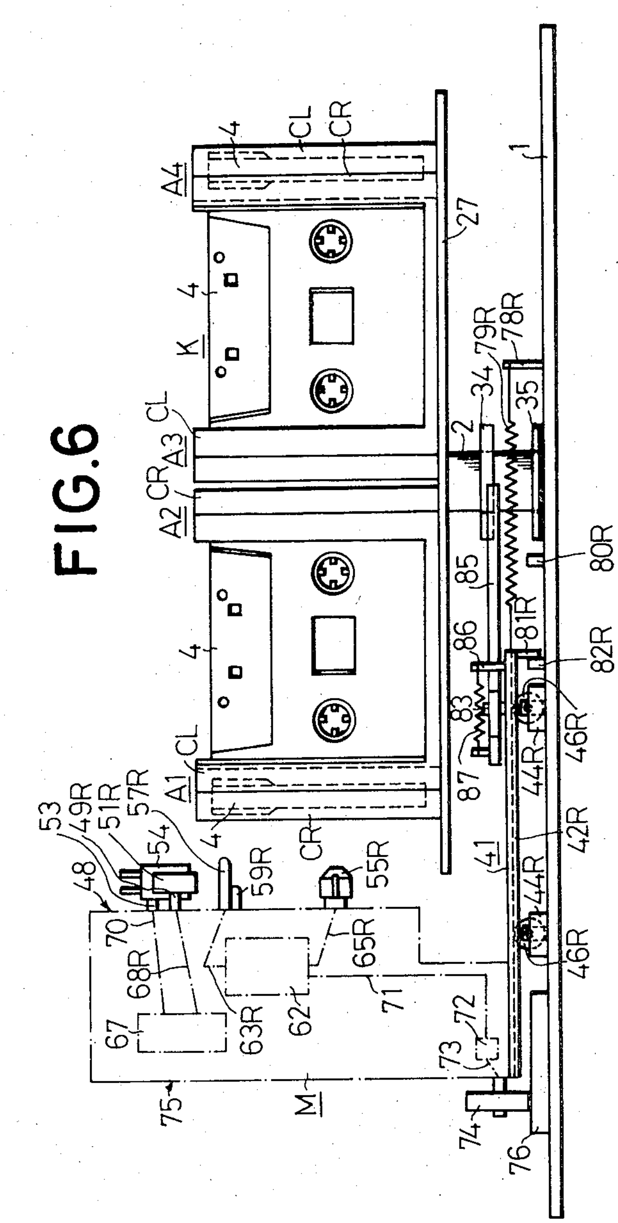
Figure 7A:
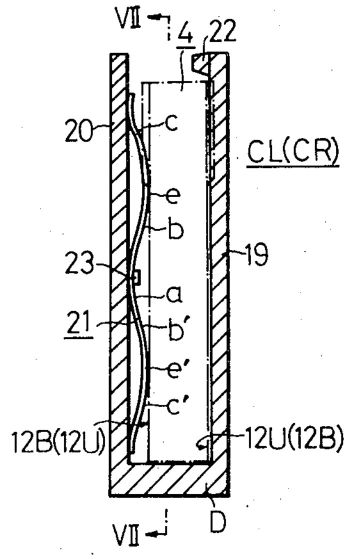
FIG. 7A is a sectional view showing a cassette holder for use with the cassette support depicted in FIGS. 5 and 6.
Figure 7B:
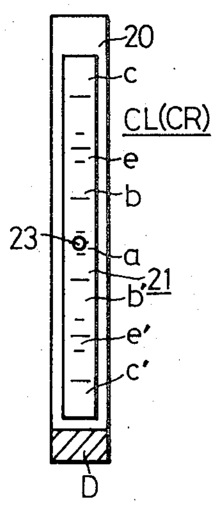
FIG. 7B is a sectional view taken on the line VII-VII in FIG. 7A.

With reference to FIGS. 5 to 7 another example of this invention will hereinbelow be described. In the present example elements similar to those in FIGS. 1 to 4 are identified by the same reference numerals and characters and no detailed description will be repeated for the sake of brevity.

The disc 27 of the cassette support K has disposed on the marginal portion thereof cassette holders A1 to A6 in the following manner. Namely, each of the cassette holders A1 to A6 has left and right guide frames CL and CR for guiding left and right sides of the casing 5 of the cassette 4 respectively and a receiving plate D receiving the back 17 of the casing 5. Each cassette holder is mounted on the disc 27 with the receiving plate D being fixed on the latter. In this case, each of the left and right guide frames CL and CR consists of a side guide plate 18 for guiding the left or right side 16L or 16R and a pair of opposing outer and inner guide plates 19 and 20 for guiding the left or right sides of the top or bottom of the casing 5. As clearly shown in FIG. 7, the inner guide plate 20 has enclosed therein a spring 21 by means of which the top 12U or bottom 12B of the casing 5 is urged against the inside of the outer guide plate 19 and the free end of the outer guide plate 19 on the opposite side from the receiving plate D has formed thereon an inward projection 22 engageable with the left and right sides of the front 9 of the casing 5 for ensuring that the casing 51 is guided by the left and right guide frames CL and CR. In this case, the spring 21 consists of a portion *b* extending up inwardly from a central portion *a*, a portion *c* extending up outwardly from the portion *b*, a portion *b'* extending down inwardly from the central portion *a* and a portion *c'* extending down outwardly from the portion *b'*. The spring 21 is fixed by a mounting member 23 at the central portion *a* to the guide plate 20 centrally thereof in a vertical direction. Consequently, when the casing 5 of the cassette 4 has been guided down to its lowered position by the left and right guide frames CL and CR, projecting portions *e* and *e'* of the spring 21 between the portions *b* and *c* and between *b'* and *c'* thereof press on the top 12U or bottom 12B of the casing 5 and the free ends of the end portions *c* and *c'* press on the inside of the guide plate 20, thereby biasing the casing 5 toward the guide plate 19 to urge its bottom 12B or top 12U against the latter. The projection 22 is to prevent vertical displacement of the casing 5 has been guided down to its lower positioned by the guide frames CL and CR and is urged by the spring 21 on the guide plate 19.

With such an arrangement as described in connection with FIGS. 5 and 7, when the cassette 4 is inserted from above into the cassette holder with the back 17 of the cassette 4 down against the spring 21, the cassette 4 is positioned in the forward and backward directions, that is, in the direction of the actuating mechanism M with the top 12U or bottom 12B of the cassette 4 being urged against the plate 19 of the guide frames CL and CR and the vertical displacement of the cassette 4 is limited by the projection 22 and positioned in a vertical direction, and thus the cassette 4 is retained in the cassette holder.

Thus, the cassettes held in the cassette holders A1 to A6 are sequentially selected and signals recorded on the magnetic tapes contained in the cassettes are automatically reproduced continuously for many hours, as is the case with the example shown in FIGS. 1 to 4. In this case, it must be noted that since the cassette 4 held in each cassette holder is positioned while being biased by the spring 21 with the top 12U or bottom 12B being pressed against the outer guide plates 19 of the guide frames CL and CR, the magnetic head 54 makes contact with a predetermined track of the magnetic tape 8 without practically appreciable tracking error and that unnecessary displacement of the cassette 4 can be avoided by the projection 22, thereby to ensure that the magnetic head 54 is pressed against the magnetic tape 8 at a constant contact pressure. Further, the cassette 4 held in the cassette holder can be readily removed therefrom by holding the former from above and pulling it out from the holder while tilting it a little backwardly against the spring 21 to keep away from the projection 22. Accordingly, the cassettes 4 can be easily replaced with others.

Figure 8A:
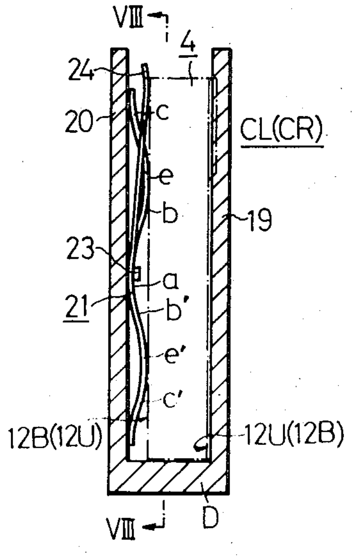
FIG. 8A is a sectional view showing a modified form of the cassette holder.
Figure 8B:
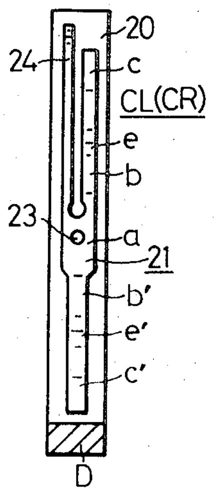
FIG. 8B is a sectional view taken on the line VIII-VIII in FIG. 8A.

FIG. 8 illustrates a modified form of the cassette holders A1 to A6 of FIGS. 5 and 6 which can be used with the cassette support K of this invention. In FIG. 8 elements similar to those in FIG. 7 are marked with the same reference numerals and no detailed description will be repeated. The present example does not employ such a projection 22 as shown in FIG. 7 is left out but instead employs a spring 24 which is inwardly bent for engagement with the left and right sides of the front edge of the casing 5 so as to retain the casing 5 of the cassette 4 in its guided position. The spring 24 extends up outwardly from the central portion *a* of the spring 21 in parallel with the portions *b*, *e* and *c* and is designed to prevent vertical displacement of the casing 5 while the casing 5 is urged against the guide plates 19 by the spring 21 after guided down to the lowered position by the guide frames CL and CR.

With such a cassette holder, when the cassette 4 is inserted into the cassette holder from above against the springs 21 and 24 with the back 17 of the cassette 4 down, the cassette 4 is positioned in the forward and backward direction, that is, in the direction of the actuating mechanism M with the top 12U or bottom 12B of the cassette 4 being pressed against the plates 19 of the guide frames CL and CR and, further, the vertical displacement of the cassette 4 is limited by the spring 24 and the cassette 4 is thus positioned in a vertical direction. Thus, the cassettes are held in the cassette holders A1 to A6.

Figure 9:
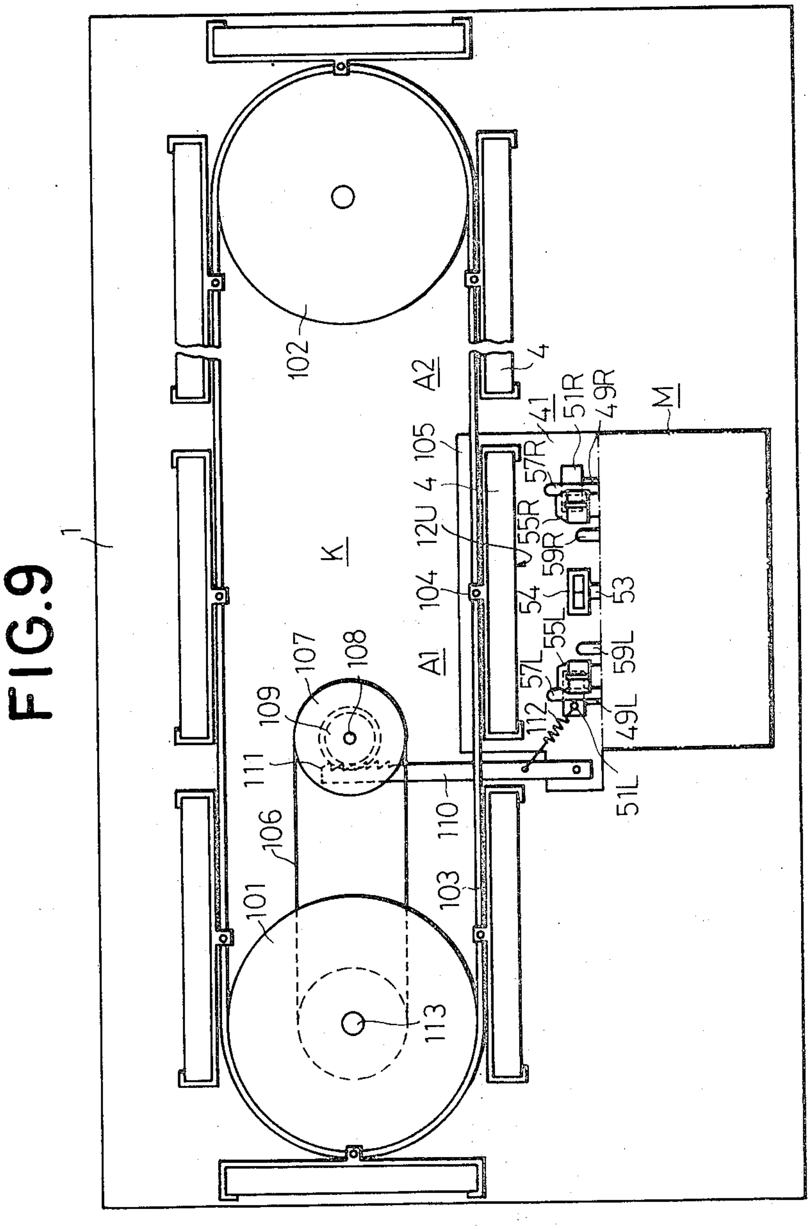
FIGS. 9 and 10 are schematic diagrams illustrating other examples of the cassette support according to this invention.

FIG. 9 illustrates a modified form of the cassette support K in which a pair of pulleys 101 and 102 are pivotally mounted on the chassis 1; a belt 103 is stretched between the both pulleys 101 and 102; and a plurality of cassette holders A1, A2, . . . are each attached by a pin 104 to the outside of the belt 103 at the upper and lower edges of the back plate of each holder. Consequently, by supporting cassettes 4 similar to the aforementioned ones with the holders A1, A2, . . . , the first surface 12U and/or 12B of each cassette 4 carried by the belt 103 between the pulleys 101 and 102 is caused to lie in a vertical plane parallel to the main surface of the belt 103. While, a stopper plate 105 is disposed at a position rearwardly of the belt 103 between the pulleys 101 and 102 and an actuating mechanism M similar to the aforementioned one is disposed on the chassis 1 in opposing relation to the stopper plate 105. Further, a shaft 113 of the pulley 101 is coupled through another belt 106 to a pulley 107 which is pivotally mounted on the chassis 1 and a ratched wheel 109 corresponding to the aforementioned one 34 is attached to a shaft 108 of the pulley 107 and teeth 111 formed on the free end portion of an arm 110 corresponding to the aforementioned rotary arm 85 which is biased by a spring 112 are meshed with the ratchet wheel 109. Thus, every time the actuating mechanism M is moved back and forth as above described, the ratchet wheel 109 is turned to sequentially move the pulley 101 and consequently the belt 103, thereby to bring the cassettes 4 held by the holders A1, A2, . . . to the position of the stopper plate 105 one after another, so that the tapes contained in the cassettes are sequentially played back.

Figure 10:
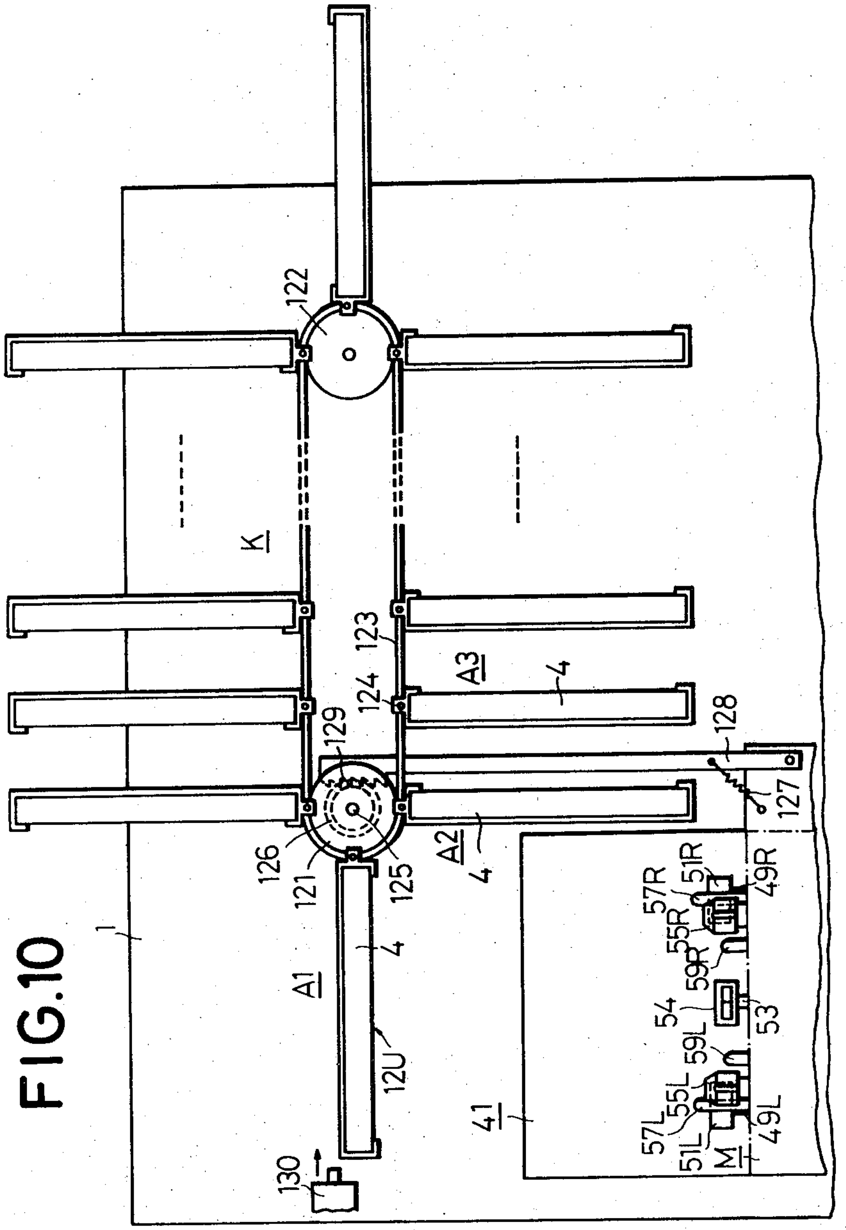

FIG. 10 shows another modified form of the cassette support K, in which a pair of pulleys 121 and 122 are pivotally mounted on the chassis 1, a belt 123 is stretched between the pulleys 121 and 122 and a plurality of cassette holders A1, A2, . . . are each attached by a pin 124 to the outside of the belt 123 at the center of the upper and lower edges of the left-hand side of the holder. Accordingly, when similar cassettes 4 are supported with the holders A1, A2, . . . , the first surface 12U and/or 12B of each cassette lies in a vertical plane perpendicular to the plane of the belt 123. An actuating mechanism M similar to the aforementioned one is disposed on the chassis 1 in opposing relation to one cassette which is brought to a position from where the first surface 12U or 12B of the cassette 4 lying outside of the pulley 121 on the opposite side from the pulley 122 can be seen. Further, a ratchet wheel 126 corresponding to the aforementioned one 34 is affixed to a shaft 125 of the pulley 121 and teeth 129 formed on the free end portion of an arm 128 corresponding to the aforementioned rotary arm 84, which is biased by a spring 127, is meshed with the ratchet wheel 126. Thus, every time the actuating mechanism M is moved back and forth as above described, the ratchet wheel 126 is turned to move the pulley 121 and consequently the belt 123, by which the cassettes 4 held by the holders. A1, A2, . . . are sequentially brought to the position from where the first surface 12U or 12B of the preceding cassette can be seen, and then the tapes contained in the cassettes are sequentially reproduced in the aforesaid manner. Reference numeral 130 indicates a plunger which is urged against the back of the holder to position it when one cassette has been brought to the aforesaid position from which the first surface 12U or 12B can be seen.

What I claim as my invention:

1. An automatic cassette changer comprising:

*a.* a cassette support mounted on a horizontal main chassis in a manner to be rotatable step by step, the cassette support having sequentially and endlessly arranged thereon a plurality of cassette holders, each arranged to hold a cassette with a first major surface of its casing being vertical, the cassette containing reels with a magnetic tape wound thereon, the casing having at least reel shaft apertures, a capstan aperture and a magnetic head opening formed in a second major surface substantially perpendicular to the first major surface,

*b.* an actuating mechanism mounted on a horizontal sub-chassis, the actuating mechanism including a capstan, reel drive shafts and a magnetic head projecting in a horizontal direction, driving means for driving the capstan and the reel drive shafts and actuating means for mechanically actuating the magnetic head in a vertical direction,

*c.* guide means for guiding the horizontal sub-chassis along a straight line on the horizontal main chassis that is perpendicular to a major surface of a cassette held in playing position so that the capstan and the reel drive shafts are brought into engagement with the capstan aperture and the reel shaft apertures of the cassette,

*d.* a driving mechanism for driving the horizontal sub-chassis by the driving means of the actuating mechanism so that the capstan and the reel drive shafts of the actuating mechanism are brought out of normal engagement with the capstan aperture and the reel shaft apertures of one of the cassettes through the guide means,

*e.* rotating means for rotating the cassette support by one step by the movement of the horizontal sub-chassis when the horizontal sub-chassis is driven by the driving mechanism, and,

*f.* control means for controlling the driving means to drive the capstan and the reel drive shafts for driving the magnetic tape when the capstan and the reel drive shafts of the actuating mechanism are held in engagement with the capstan aperture and the reel shaft apertures of one of the cassettes respectively and controlling the actuating means to mechanically actuate it in a vertical direction to bring the magnetic head into contact with the magnetic tape through the magnetic head opening.

2. An automatic cassette changer according to claim 1, wherein the cassette support has a plurality of guide members corresponding to the plurality of cassette holders respectively and the horizontal subchassis has an engaging member engageable with one of the guide members for predetermining the position where the capstan and the reel drive shafts are brought into engagement with the capstan aperture and the reel shaft apertures of one of the cassettes.

3. An automatic cassette changer according to claim 1, wherein the cassette support is detachably mounted on a shaft extending upwardly from the horizontal main chassis in a vertical direction.

4. An automatic cassette changer according to claim 7, which further comprises a contact mechanism associated with the cassette support for producing a signal indicating that one of the cassettes positioned in playing position.

5. An automatic cassette changer according to claim 1, which further comprises biasing means disposed between the horizontal sub-chassis and the horizontal main chassis for retaining the capstan and the reel drive shafts of the actuating mechanism in normal engagement with the capstan aperture and the reel drive shaft apertures of one of the cassettes.

6. An automatic cassette changer according to claim 1, wherein the rotating means includes a ratchet mechanism provided in association with the cassette support and a click provided on the horizontal sub-chassis and engageable with the ratchet mechanism.

7. An automatic cassette changer according to claim 5, wherein the driving mechanism includes a clutch mechanism for bringing the horizontal sub-chassis in its standstill state when the latter has been driven to a predetermined position.

* * * * *